(12) United States Patent
Cho et al.

(10) Patent No.: US 12,374,987 B2
(45) Date of Patent: Jul. 29, 2025

(54) SWITCHING REGULATOR, SYSTEM-ON-CHIP INCLUDING THE SWITCHING REGULATOR, AND OPERATING METHOD OF THE SWITCHING REGULATOR

(71) Applicant: Samsung Electronics Co., Ltd., Suwon-si (KR)

(72) Inventors: Jeong Hyun Cho, Daejeon (KR); Hyun Sik Kim, Daejeon (KR); Hong Hyun Bae, Daejeon (KR)

(73) Assignees: Samsung Electronics Co., Ltd., Gyeonggi-do (KR); Korea Advanced Institute of Science and Technology, Daejeon (KR)

( * ) Notice: Subject to any disclaimer, the term of this patent is extended or adjusted under 35 U.S.C. 154(b) by 203 days.

(21) Appl. No.: 18/065,164

(22) Filed: Dec. 13, 2022

(65) Prior Publication Data
US 2023/0231473 A1    Jul. 20, 2023

(30) Foreign Application Priority Data

Jan. 19, 2022  (KR) .................. 10-2022-0008045
Jul. 26, 2022  (KR) .................. 10-2022-0092373

(51) Int. Cl.
*H02M 1/00*  (2007.01)
*G06F 1/26*  (2006.01)
(Continued)

(52) U.S. Cl.
CPC ............ *H02M 1/0095* (2021.05); *G06F 1/26* (2013.01); *H02M 3/07* (2013.01); *H02M 3/1586* (2021.05)

(58) Field of Classification Search
CPC .... H02M 3/1582; H02M 3/156; H02M 3/157; H02M 3/158; H02M 3/1584;
(Continued)

(56) References Cited

U.S. PATENT DOCUMENTS 6,940,261 B1   9/2005   Umminger
8,792,254 B2   7/2014   Reddy
(Continued)

FOREIGN PATENT DOCUMENTS

JP   2006-223088 A   8/2006
JP   2015-065781 A   4/2015

*Primary Examiner* — Jeffrey A Gblende
(74) *Attorney, Agent, or Firm* — Harness, Dickey & Pierce, P.L.C.

(57) ABSTRACT

A switching regulator, system-on-chip including the switching regulator, and operating method of the switching regulator are provided. The switching regulator comprises a first inductor having a first end connected to a first node and a second end connected to an output terminal, a second inductor having a first end connected to a second node and a second end connected to the output terminal, a flying capacitor having a first end connected to the first node and a second end connected to the second node, and control circuitry configured to at each of first through fourth times control the first switch, the second switch, the third switch, the fourth switch, the fifth switch, the sixth switch, the seventh switch, and the eighth switch to cause the flying capacitor to store a voltage corresponding to a difference between currents flowing in the first inductor and the second inductor.

20 Claims, 13 Drawing Sheets

(51) Int. Cl.
  *H02M 3/07* (2006.01)
  *H02M 3/158* (2006.01)
(58) Field of Classification Search
  CPC ............... H02M 3/1586; H02M 3/285; H02M 3/33561; H02M 7/49; H02M 1/045; H02M 7/006; H02M 7/06; H02M 7/068; H02M 7/153; H02M 7/10; H02M 1/088; H02M 7/103; H02M 7/106; H02M 7/19; H02M 7/08; H02M 7/17; H02M 2001/007; H02M 7/493; H02M 7/53806; H02M 7/5381; H02M 7/483; H02M 7/217; H02M 7/538466; H02M 7/5387; H02M 7/53871; H02M 7/53873; H02M 7/53875; H02M 1/084; H02M 1/0845; H02M 1/007; H02M 1/0009; H02M 1/0095; H02M 1/08; H02M 3/1588; H02M 7/5395; H02M 1/14; H02M 1/0043; H02M 1/0074; H02M 1/0077; H02M 3/07; H02M 3/073; H02M 2003/071; H02M 2003/072; H02M 2003/075; H02M 2003/076; H02M 2003/077; H02M 2003/078; H02M 2001/0048; H02J 3/46; H02J 3/38
  See application file for complete search history.

(56) References Cited

U.S. PATENT DOCUMENTS

| | | | |
|---|---|---|---|
| 10,700,607 B2 | 6/2020 | Chen et al. | |
| 10,903,739 B2 | 1/2021 | Toni | |
| 11,101,734 B2 | 8/2021 | Lin et al. | |
| 11,296,597 B1 * | 4/2022 | Puggelli | G11C 5/145 |
| 11,532,987 B2 * | 12/2022 | Han | H02M 1/0058 |
| 11,581,796 B2 * | 2/2023 | Yan | H02M 1/0025 |
| 11,601,049 B2 * | 3/2023 | Jong | H02M 3/1584 |
| 2020/0091818 A1 * | 3/2020 | Toni | H02M 3/07 |
| 2021/0184594 A1 | 6/2021 | Shen et al. | |

* cited by examiner

10

SWITCHING REGULATOR, SYSTEM-ON-CHIP INCLUDING THE SWITCHING REGULATOR, AND OPERATING METHOD OF THE SWITCHING REGULATOR

CROSS-REFERENCE TO RELATED APPLICATION

This application claims priority from Korean Patent Application No. 10-2022-0008045 filed on Jan. 19, 2022, and Korean Patent Application No. 10-2022-0092373 filed on Jul. 26, 2022, in the Korean Intellectual Property Office, and all the benefits accruing therefrom under 35 U.S.C. 119, the contents of which are herein incorporated by reference in their entirety.

BACKGROUND

1. Field

The present disclosure relates to a switching regulator, a system-on-chip (SoC) including the switching regulator, and an operating method of the switching regulator. More particularly the present disclosure relates to a switching regulator for maintaining multi-phase current balance, an SoC including the switching regulator, and an operating method of the switching regulator.

2. Description of the Related Art

With the development of technology, an efficient power distribution is desired for high-performance computing (HPC) processing.

Specifically, for HPC processing, it is desired to perform high-speed dynamic voltage scaling (DVS) while smoothly supplying a large amount of power via a power management integrated circuit (PMIC). To this end, it is desirable for the PMIC and a processor to be completely integrated into a system-on-chip (SoC). Thus, the desire for an integrated voltage regulator (IVR) has increasingly grown. However, a typical IVR cannot solve the problem of a current imbalance between inductors therein in a high-speed switching environment.

SUMMARY

Example embodiments of the present disclosure provide a switching regulator capable of maintaining multi-phase current balance in a high-speed switching environment.

Example embodiments of the present disclosure also provide a system-on-chip (SoC) including a switching regulator capable of maintaining multi-phase current balance in a high-speed switching environment.

Example embodiments of the present disclosure also provide an operating method of a switching regulator capable of maintaining multi-phase current balance in a high-speed switching environment.

However, example embodiments of the present disclosure are not restricted to those set forth herein. The above and other example embodiments of the present disclosure will become more apparent to one of ordinary skill in the art to which the present disclosure pertains by referencing the detailed description of the present disclosure given below.

According to some example embodiments of the present disclosure, there is provided a switching regulator comprises a first inductor having a first end connected to a first node and a second end connected to an output terminal, a second inductor having a first end connected to a second node and a second end connected to the output terminal, a flying capacitor having a first end connected to the first node and a second end connected to the second node, a first switch connected to the first node to provide an input voltage to the first node, a second switch connected to the first node to provide a ground voltage to the first node, a third switch connected between the first node and the first end of the fluing capacitor, a fourth switch connected between the first end of the flying capacitor and a ground terminal, a fifth switch connected to the second node to provide the input voltage to the second node, a sixth switch connected to the second node to provide the ground voltage to the second node, a seventh switch connected between the second end of the flying capacitor and ground terminal, and an eighth switch connected between the second node and the second end of the flying capacitor, and control circuitry configured to, at each of first through fourth times, control the first switch, the second switch, the third switch, the fourth switch, the fifth switch, the sixth switch, the seventh switch, and the eighth switch to cause the flying capacitor stores a voltage corresponding to a difference between a current flowing in the first inductor and a current flowing in the second inductor.

According to some example embodiments of the present disclosure, there is provided a system-on-chip (SoC) comprises a processor, and a switching regulator supplying power to the processor, wherein the switching regulator includes a first inductor having a first end connected to a first node and a second end connected to an output terminal, a second inductor having a first end connected to a second node and a second end connected to the output terminal, and a flying capacitor having a first end connected to the first node or a ground terminal and a second end connected to the second node or the ground terminal, the first and second nodes receive one of an input voltage and a ground voltage, and the switching regulator further includes control circuitry configured to cause, at each of first through fourth times, the flying capacitor to store a voltage corresponding to a difference between a current flowing in the first inductor and a current flowing in the second inductor.

According to some example embodiments of the present disclosure, there is provided an operating method of a switching regulator comprises sensing a difference between a current flowing in a first inductor at a first time and a current flowing in a second inductor at a second time, the second inductor being different from the first inductor, the second time being different from the first time, and storing the difference between the current flowing in the first inductor at the first time and the current flowing in the second inductor at the second time, in a flying capacitor as a first voltage, sensing a difference between a current flowing in the first inductor at a third time and current flowing in the second inductor at a fourth time, is the fourth time being different from the third time, and storing the difference between the current flowing in the first inductor at the third time and the current flowing in the second inductor at the fourth time, in the flying capacitor as a second voltage, which is different from the first voltage, and correcting an output voltage based on the first and second voltages, generating a clock based on the corrected output voltage, and providing the clock to processor.

It should be noted that the effects of the present disclosure are not limited to those described above, and other effects of the present disclosure will be apparent from the following description.

BRIEF DESCRIPTION OF THE DRAWINGS

The above and other example embodiments and features of the present disclosure will become more apparent by describing in detail example embodiments thereof with reference to the attached drawings, in which.

DETAILED DESCRIPTION

Example embodiments of the present disclosure will be described with reference to the attached drawings.

Figure 1:
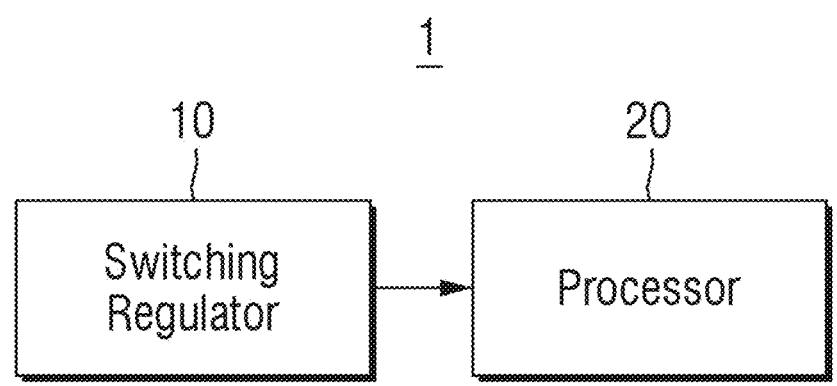
FIG. 1 is a block diagram of a system-on-chip (SoC) including a switching regulator according to some example embodiments of the present disclosure.

FIG. 1 is a block diagram of a system-on-chip (SoC) including a switching regulator according to some example embodiments of the present disclosure.

Referring to FIG. 1, an SoC 1 may include a switching regulator 10 and a processor 20.

The switching regulator 10 may supply power to the processor 20. Although not specifically illustrated in FIG. 1, the switching regulator 10 may be included in a power management integrated circuit (PMIC). The switching regulator 10 may be an element of a buck converter.

The processor 20 may receive power from the switching regulator 10 to perform various arithmetic operations. In some example embodiments, the processor 20 may be implemented as a central processing unit (CPU), a graphics processing unit (GPU), an application processor (AP), or the like, but the present disclosure is not limited thereto.

Figure 2:
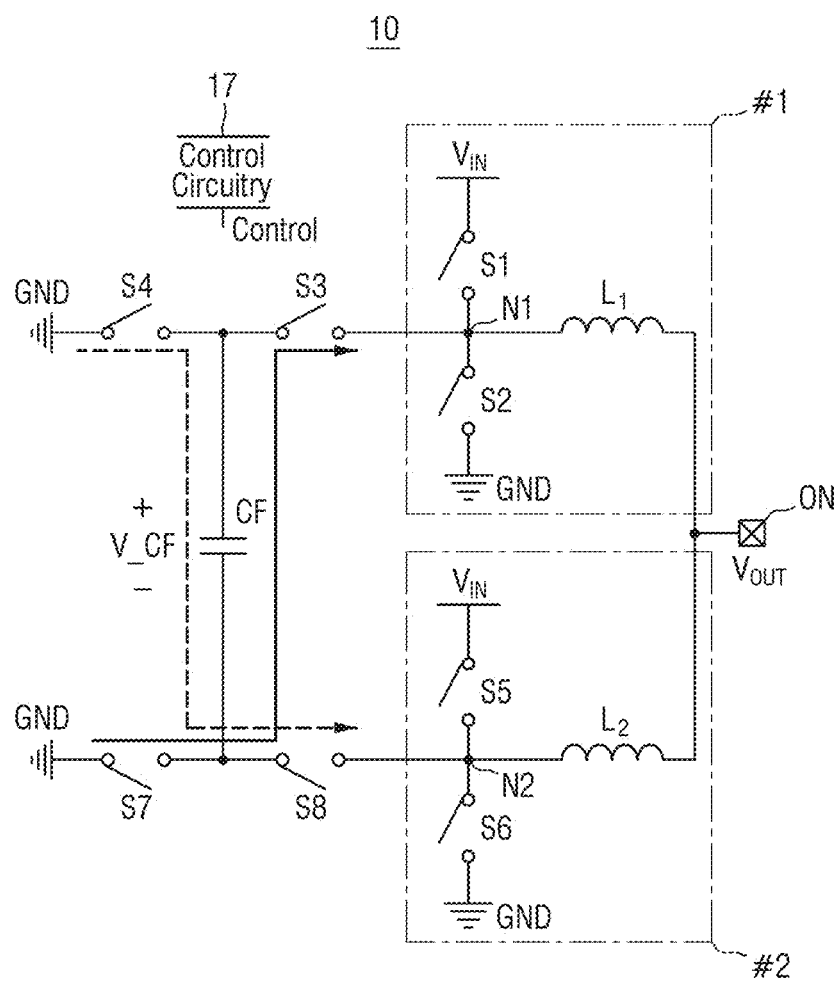
FIG. 2 is a circuit diagram of the switching regulator according to some example embodiments of the present disclosure.

FIG. 2 is a circuit diagram of the switching regulator according to some example embodiments of the present disclosure.

Referring to FIG. 2, the switching regulator 10 may include a first inductor $L_1$, a second inductor $L_2$, a flying capacitor CF, and first through eighth switches S1 through S8. The switching regulator 10 may also include control circuitry 17 for controlling the switches S1 through S8.

A first end of the first inductor $L_1$ may be connected to a first node N1. A second end of the first inductor $L_1$ may be connected to an output terminal ON.

A first end of the second inductor $L_2$ may be connected to a second node N2. A second node of the second inductor $L_2$ may be connected to the output terminal ON.

A first end of the flying capacitor CF may be connected to the first node N1. A second end of the flying capacitor CF may be connected to the second node N2.

The first node N1 may be connected to first through third switches S1 through S3. Specifically, the first switch S1 may be connected to the first node N1 to provide an input voltage $V_{IN}$ to the first node N1. The second switch S2 may connect the first node N1 and a ground terminal GND to provide a ground voltage to the first node N1. The third switch S3 may connect the first node N1 and the first end of the flying capacitor CF.

The fourth switch S4 may connect the first end of the flying capacitor CF and the ground terminal GND.

Similarly, the second node N2 may be connected to fifth, sixth, and eighth switches S5, S6, and S8. Specifically, the fifth switch S5 may be connected to the second node N2 to provide an input voltage $V_{IN}$ to the second node N2. The sixth switch S6 may connect the second node N2 and the ground terminal GND to provide the ground voltage to the second node N2. The eighth switch S8 may connect the second node N2 and the second end of the flying capacitor CF.

A seventh switch S7 may connect the second end of the flying capacitor CF and the ground terminal GND.

The first through eighth switches S1 through S8 may be implemented as metal-oxide-semiconductor field-effect transistors (MOSFETs), but the present disclosure is not limited thereto. The switches S1 through S8 may receive a control signal (control) from the control circuitry 17 which controls the switches S1 through S8 to cause the switches (e.g., gates of the MOSFET) to be open or closed. Connection between the switches S1 through S8 and the control circuitry 17 is omitted for clarity. The control circuitry 17 may be connected to the gates of each of the switches S1 through S8. The control circuitry 17 may individually control the gates of each of the switches S1 through S8 with individual signals. The control circuitry 17 may be programmed to control the switches in each of a first time T1, a second time T2, a third time T3, and a fourth time T4. The timing of the first time T1 through fourth time T4 may be programmed into the control circuitry 17 or may be based on the voltage of the first inductor L1 and the second inductor L2. For example, a clock signal may be used by the control circuitry 17 to determine when to change the control signal to the gates to progress through the first time T1 through the fourth time T4.

For convenience, the ground terminal GND and the ground voltage will hereinafter be both referred to by "GND."

Figure 3:
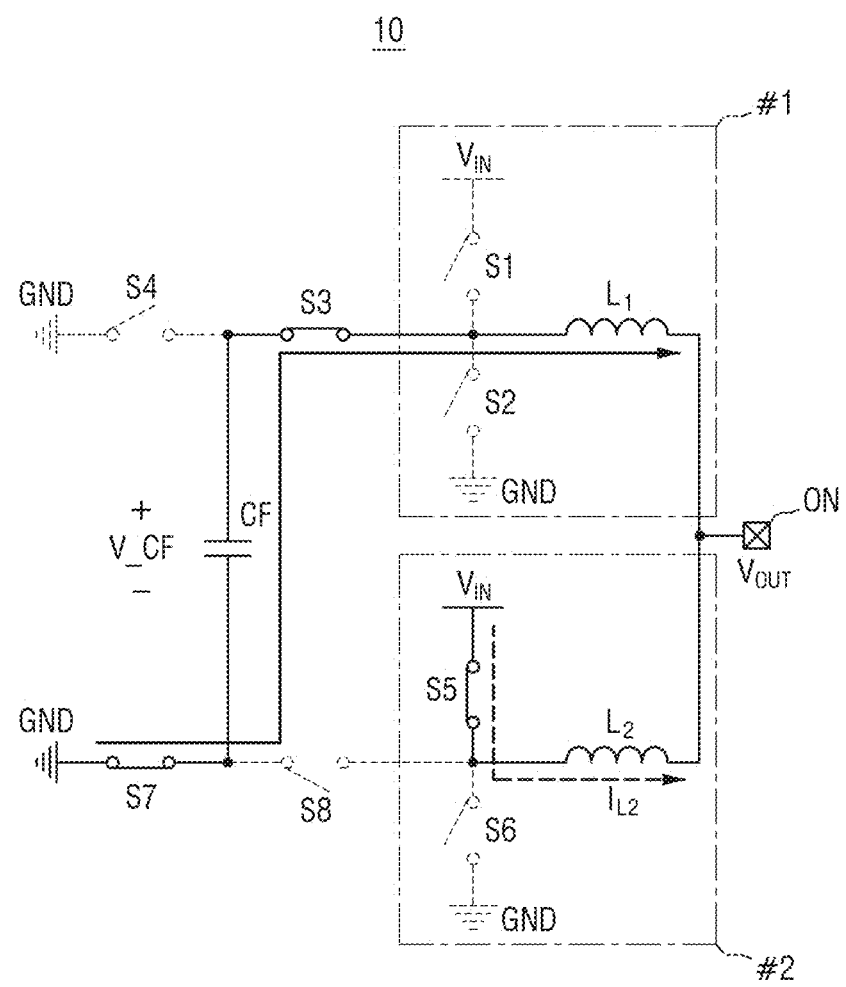
FIG. 3 is a circuit diagram for explaining an operation of the switching regulator according to some example embodiments of the present disclosure.
Figure 4:
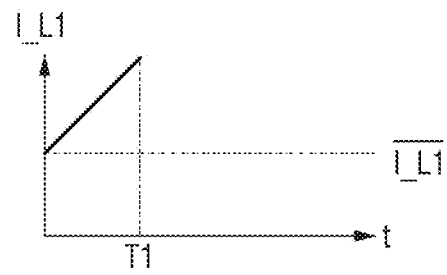
FIG. 4 is a timing diagram for explaining an operation of the switching regulator according to some example embodiments of the present disclosure.
Figure 4:
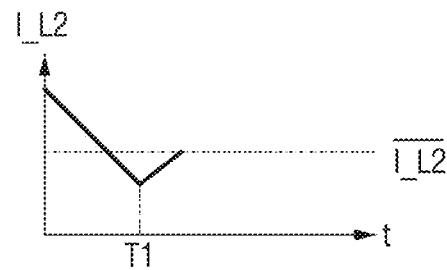
Figure 4:
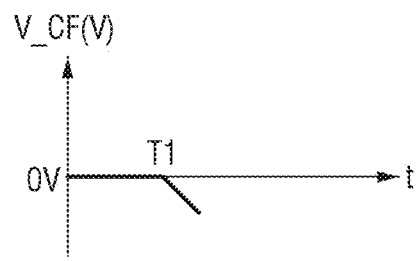

FIG. 3 is a circuit diagram for explaining an operation of the switching regulator according to some example embodiments of the present disclosure, and FIG. 4 is a timing diagram for explaining an operation of the switching regulator according to some example embodiments of the present disclosure.

Referring to FIGS. 2 through 4, before a first time T1, the first switch S1 may be connected to the first node N1, and the second switch S2 may not be connected to the first node N1. Accordingly, the input voltage $V_{IN}$ may be provided to the first node N1 so that a current corresponding to the input voltage $V_{IN}$ may flow in the first inductor $L_1$. Here, the first time T1 may refer to the time when the magnitude of the current flowing in the first inductor $L_1$ reaches an upper threshold (e.g., maximum, local maximum, desired level, etc.) or the time when the magnitude of the current flowing in the second inductor $L_2$ lowers to a lower threshold (e.g., minimum, local minimum, desired level, etc.).

Before the first time T1, the fifth switch S5 may not be connected to the second node N2, and the sixth switch S6 may be connected to the second node N2. Accordingly, the ground voltage GND may be provided to the second node N2 so that the magnitude of the current flowing in the second inductor $L_2$ may decrease.

Thereafter, at the first time T1, the third switch may connect the first node N1 to the first end of the flying capacitor CF, and the fourth switch S4 may not be connected to the first end of the flying capacitor CF. Also, the seventh switch S7 may be connected to the second end of the flying capacitor CF, and the eighth switch S8 may not connect the second node N2 to the second end of the flying capacitor CF. Accordingly, a voltage corresponding to the current flowing in the first inductor $L_1$ may be stored in the flying capacitor CF. Specifically, at the polarity of the flying capacitor CF, illustrated in FIG. 3, a current may flow in a direction that discharges the flying capacitor CF, and as a result, a voltage V_CF of the flying capacitor CF may have a negative value.

Figure 5:
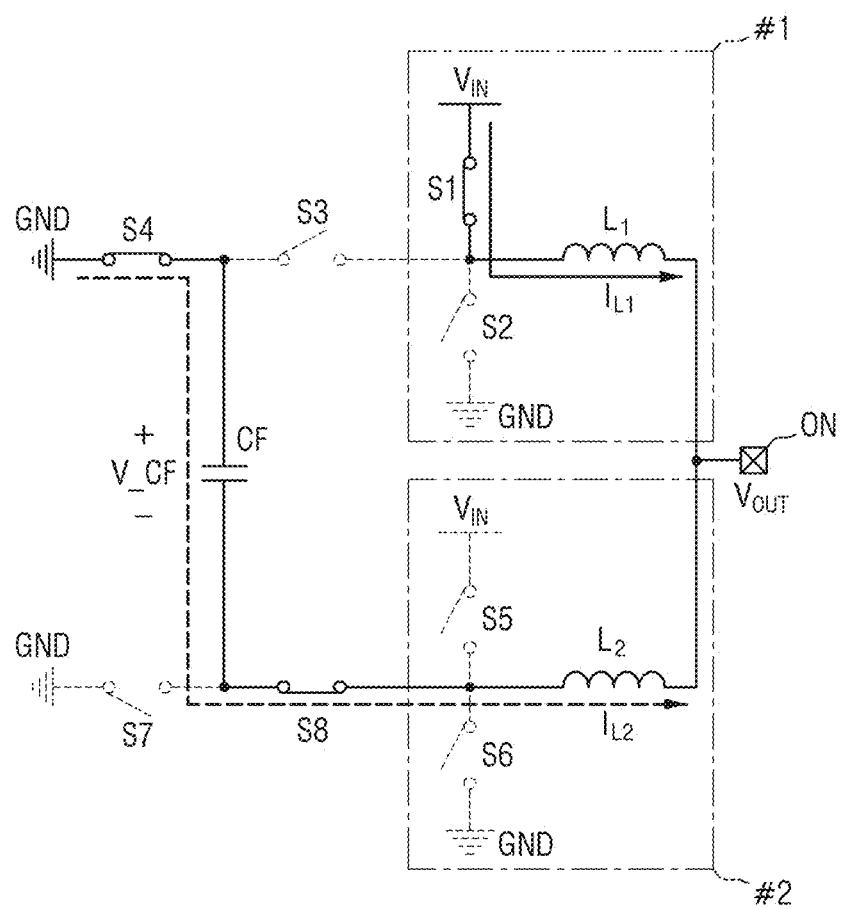
FIGS. 5 and 6 are a circuit diagram and a timing diagram, respectively, for explaining an operation of the switching regulator according to some example embodiments of the present disclosure.
Figure 6:
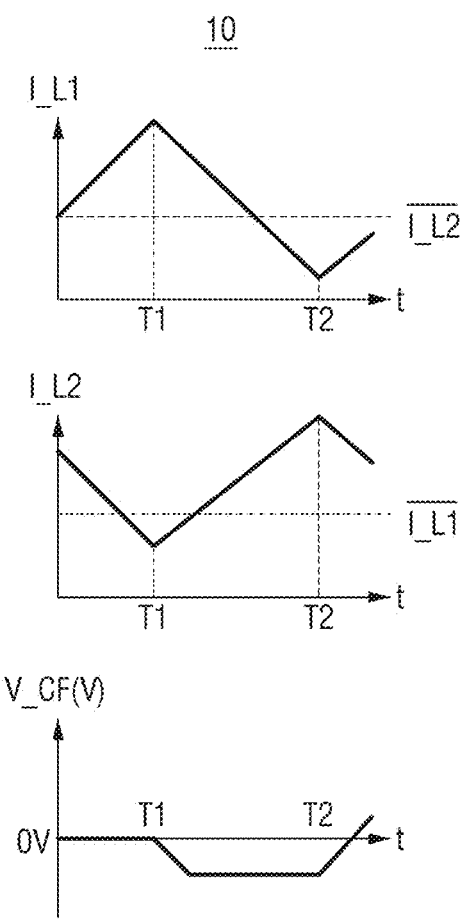

FIGS. 5 and 6 are a circuit diagram and a timing diagram, respectively, for explaining an operation of the switching regulator according to some example embodiments of the present disclosure.

Referring to FIGS. 2, 5, and 6, during a period from the first point T1 and a second point T2, the first switch S1 may not be connected to the first node N1, and the second switch S2 may be connected to the first node N1. Accordingly, the ground voltage GND may be provided to the first node N1 so that the magnitude of the current flowing in the first inductor $L_1$ may decrease. Here, the second time T2 may refer to the time when the magnitude of the current flowing in the first inductor $L_1$ lowers to a lower threshold (e.g., minimum, local minimum, desired level, etc.) or the time when the magnitude of the current flowing in the second inductor $L_2$ reaches an upper threshold (e.g., maximum, local maximum, desired level, etc.).

During the period from the first point T1 and a second point T2, the fifth switch S5 may be connected to the second node N2, and the sixth switch S6 may not be connected to the second node N2. Accordingly, the input voltage $V_{IN}$ may be provided to the second node N2 so that a current corresponding to the input voltage $V_{IN}$ may flow in the second inductor $L_2$.

Thereafter, at the second time T2, the third switch S3 may not connect the first node N1 and the first end of the flying capacitor CF, and the fourth switch S4 may be connected to the first end of the flying capacitor CF. Also, the seventh switch S7 may not be connected to the second end of the flying capacitor CF, and the eighth switch S8 may connect the second node N2 to the second end of the flying capacitor CF. Accordingly, a voltage corresponding to the current flowing in the second inductor $L_2$ may be stored in the flying capacitor CF. Specifically, at a polarity of the flying capacitor CF, illustrated in FIG. 5, a current may flow in a direction that charges the flying capacitor CF, and as a result, the voltage V_CF of the flying capacitor CF may have a positive value.

A maximum or high current flowing in the first inductor $L_1$ may differ from a maximum or high current flowing in the second inductor $L_2$. For example, even if the first and second inductors $L_1$ and $L_2$ are both provided with the same input voltage $V_{IN}$ and the same ground voltage GND, different currents may flow in the first and second inductors $L_1$ and $L_2$ because of the first and second inductors $L_1$ and $L_2$ having different inductances. To address such a current imbalance, the flying capacitor CF may sense the difference between the maximum or high current flowing in the first inductor $L_1$ and the maximum or high current flowing in the second inductor $L_2$ and may thus store the result of the sensing as a voltage.

For example, if the maximum or high current flowing in the first inductor $L_1$ is less than the maximum or high current flowing in the second inductor $L_2$, the voltage stored in the flying capacitor CF, corresponding to the difference between the maximum or high current flowing in the first inductor $L_1$ and the maximum or high current flowing in the second inductor $L_2$, may have a positive value. On the contrary, if the maximum or high current flowing in the first inductor $L_1$ is greater than the maximum or high current flowing in the second inductor $L_2$, the voltage stored in the flying capacitor CF, corresponding to the difference in the maximum or high current flowing in the first inductor $L_1$ and the maximum or high current flowing in the second inductor $L_2$, may have a negative value.

Figure 7:
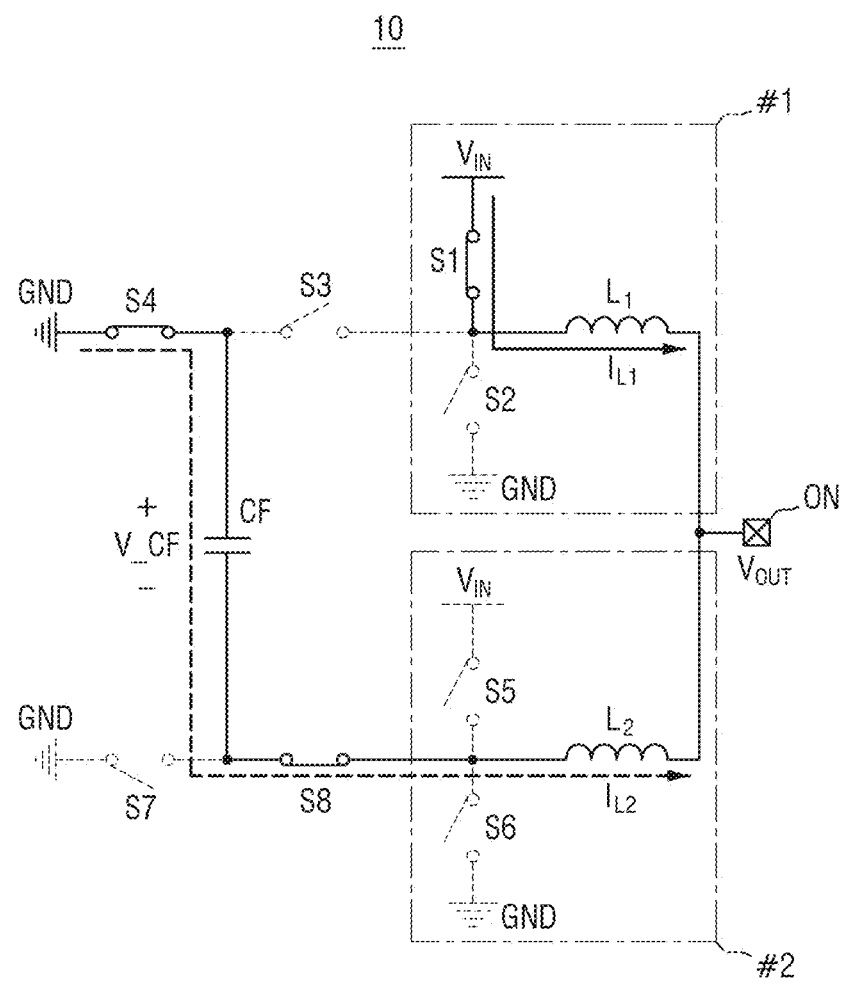
FIGS. 7 and 8 are a circuit diagram and a timing diagram, respectively, for explaining an operation of the switching regulator according to some example embodiments of the present disclosure.
Figure 8:
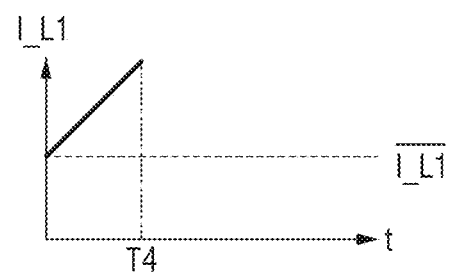
Figure 8:
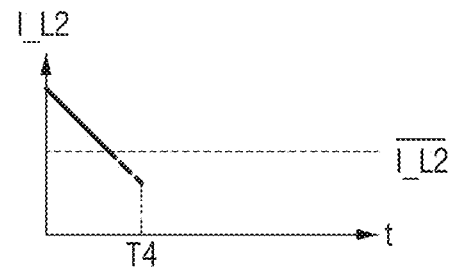
Figure 8:
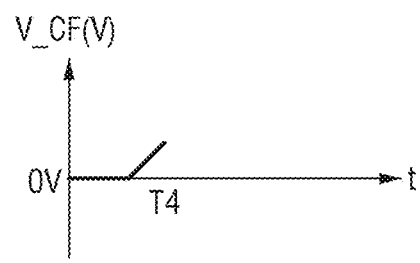

FIGS. 7 and 8 are a circuit diagram and a timing diagram, respectively, for explaining an operation of the switching regulator according to some example embodiments of the present disclosure.

Referring to FIGS. 2, 7, and 8, before a fourth time T4, the first switch S1 may be connected to the first node N1, and the second switch S2 may not be connected to the first node N1. Accordingly, the input voltage $V_{IN}$ may be provided to the first node N1 so that a current corresponding to the input voltage $V_{IN}$ may flow in the first inductor $L_1$. Here, the fourth time T4 may refer to the time when the magnitude of the current flowing in the first inductor $L_1$ reaches an upper threshold (e.g., maximum, local maximum, desired level, etc.) or the time when the magnitude of the current flowing in the second inductor $L_2$ lowers to a lower threshold (e.g., minimum, local minimum, desired level, etc.).

Before the fourth time T4, the fifth switch S5 may not be connected to the second node N2, and the sixth switch S6 may be connected to the second node N2. Accordingly, the ground voltage GND may be provided to the second node N2 so that the magnitude of the current flowing in the second inductor $L_2$ may decrease.

Thereafter, at the fourth time T4, the third switch S3 may not connect the first node N1 to the first end of the flying capacitor CF, and the fourth switch S4 may be connected to the first end of the flying capacitor CF. Also, the seventh switch S7 may not be connected to the second end of the flying capacitor CF, and the eighth switch S8 may connect the second node N2 to the second end of the flying capacitor CF. Accordingly, a voltage corresponding to the current flowing in the second inductor $L_2$ may be stored in the flying capacitor CF. Specifically, at a polarity of the flying capacitor CF, illustrated in FIG. 7, a current may flow in the direction that charges the flying capacitor CF, and as a result, the voltage V_CF of the flying capacitor CF may have a positive value.

Figure 9:
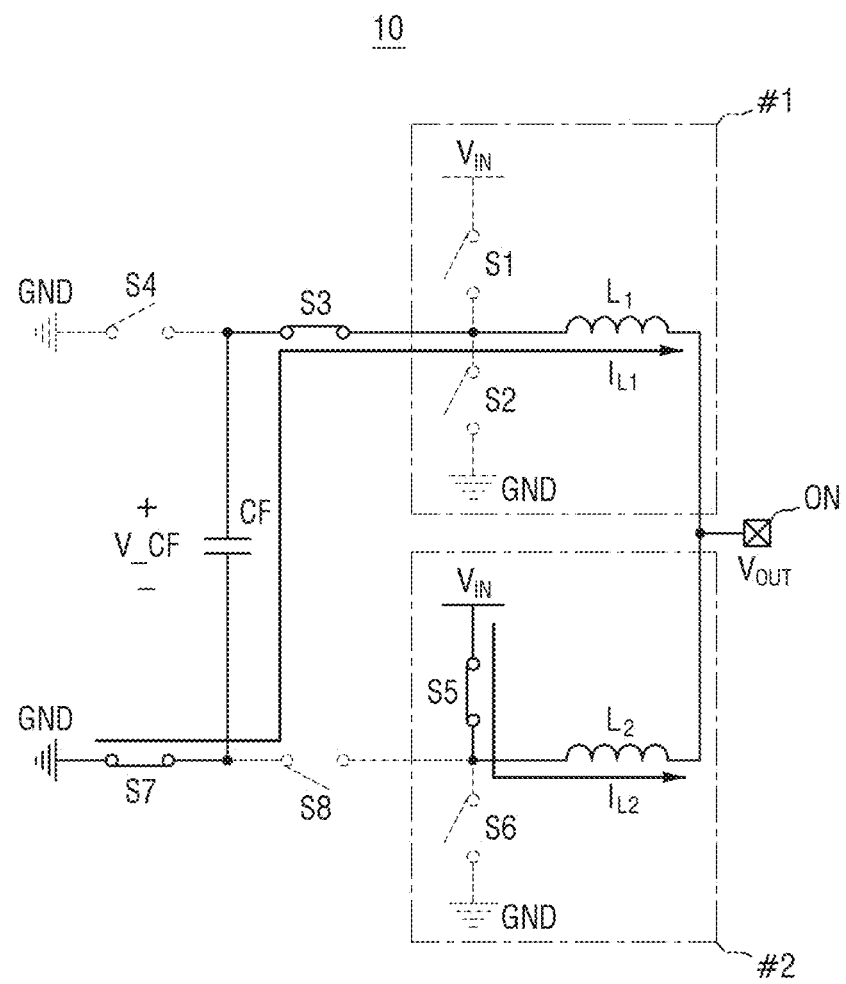
FIGS. 9 and 10 are a circuit diagram and a timing diagram, respectively, for explaining an operation of the switching regulator according to some example embodiments of the present disclosure.
Figure 10:
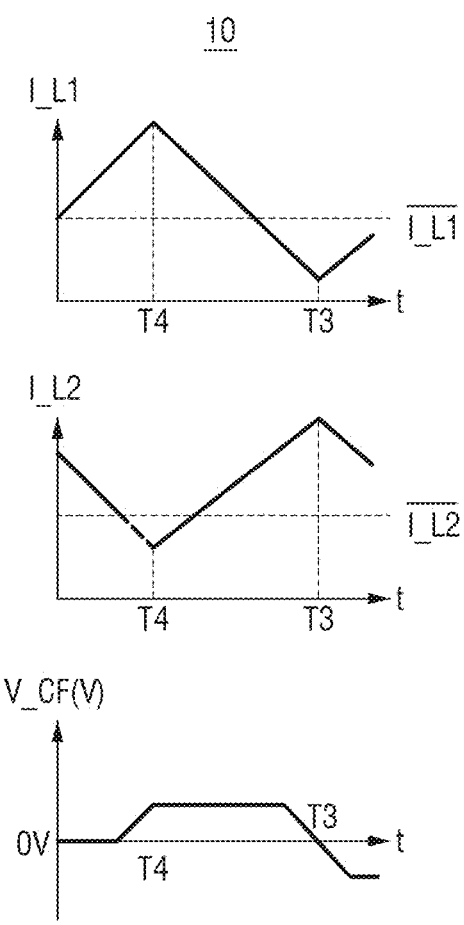

FIGS. 9 and 10 are a circuit diagram and a timing diagram, respectively, for explaining an operation of the switching regulator according to some example embodiments of the present disclosure.

Referring to FIGS. 2, 9, and 10, during a period between the fourth time T4 and a third time T3, the first switch S1 may not be connected to the first node N1, and the second switch S2 may be connected to the first node N1. Accordingly, the ground voltage GND may be provided to the first node N1 so that the magnitude of the current flowing in the first inductor $L_1$ may decrease. Here, the third time T3 may refer to the time when the magnitude of the current flowing in the first inductor $L_1$ lowers to a lower threshold (e.g., minimum, local minimum, desired level, etc.) or the time when the magnitude of the current flowing in the second inductor $L_2$ reaches an upper threshold (e.g., maximum, local maximum, desired level, etc.).

During the period between the fourth time T4 and the third time T3, the fifth switch S5 may be connected to the second node N2, and the sixth switch S6 may not be connected to the second node N2. Accordingly, the input voltage $V_{IN}$ may be provided to the second node N2 so that the current corresponding to the input voltage $V_{IN}$ may flow in the second inductor $L_2$.

Thereafter, at the third time T3, the third switch S3 may connect the first node N1 to the first end of the flying capacitor CF, and the fourth switch S4 may not be connected to the first end of the flying capacitor CF. Also, the seventh switch S7 may be connected to the second end of the flying capacitor CF, and the eighth switch S8 may not connect the second node N2 to the second end of the flying capacitor CF. Accordingly, a voltage corresponding to the current flowing in the first inductor $L_1$ may be stored in the flying capacitor CF. Specifically, at the polarity of the flying capacitor CF, illustrated in FIG. 9, a current may flow in a direction that discharges the flying capacitor CF, and as a result, the voltage V_CF of the flying capacitor CF may have a negative value.

Similarly to what has been described above with reference to FIGS. 3 through 6, a minimum or low current flowing in the first inductor $L_1$ may differ from a minimum or low current flowing in the second inductor $L_2$. For example, even if the first and second inductors $L_1$ and $L_2$ are both provided with the same input voltage $V_{IN}$ and the same ground voltage GND, different currents may flow in the first and second inductors $L_1$ and $L_2$ because of the first and second inductors $L_1$ and $L_2$ having different inductances. To address such a current imbalance, the flying capacitor CF may sense the difference between the minimum or low current flowing in the first inductor $L_1$ and the minimum or low current flowing in the second inductor $L_2$ and may thus store the result of the sensing as a voltage.

For example, if the minimum or low current flowing in the first inductor $L_1$ is less than the minimum or low current flowing in the second inductor $L_2$, the voltage stored in the flying capacitor CF, corresponding to the difference in the minimum or low current flowing in the first inductor $L_1$ and the minimum or low current flowing in the second inductor $L_2$, may have a positive value. On the contrary, if the minimum or low current flowing in the first inductor $L_1$ is greater than the minimum or low current flowing in the second inductor $L_2$, the voltage stored in the flying capacitor CF, corresponding to the difference in the minimum or low current flowing in the first inductor $L_1$ and the minimum or low current flowing in the second inductor $L_2$, may have a negative value.

As described above, average currents in the first and second inductors $L_1$ and $L_2$ can be equalized by sensing the difference between the current flowing in the first inductor $L_1$ and the current flowing in the second inductor $L_2$, storing the result of the sensing as a voltage in the flying capacitor CF, and correcting the voltage.

Referring to FIGS. 2 through 10, each of the first and fourth times T1 and T4 may refer to the time when the magnitude of the current flowing in the first inductor $L_1$ reaches an upper threshold (e.g., maximum, local maximum, desired level, etc.) and the magnitude of the current flowing in the second inductor $L_2$ lowers to a lower threshold (e.g., minimum, local minimum, desired level, etc.), and each of (or alternatively, at least one of) the second and third times T2 and T3 may refer to the time when the magnitude of the current flowing in the first inductor $L_1$ lowers to a lower threshold (e.g., minimum, local minimum, desired level, etc.) and the magnitude of the current flowing in the second inductor $L_2$ reaches an upper threshold (e.g., maximum, local maximum, desired level, etc.). However, different operations may be performed at the first and fourth times T1 and T4, and different operations may be performed at the second and third times T2 and T3. Accordingly, control of the switches S1 through S8 by the control circuitry 17 may be the same during the first and fourth times T1 and T4. Also, control of the switches S1 through S8 by the control circuitry 17 may be the same during the second and third times T2 and T3.

That is, the storing of a voltage corresponding to the maximum or high current flowing in the first inductor $L_1$ may be performed at the first time T1, and the storing of a voltage corresponding to the minimum or low current flowing in the second inductor $L_2$ may be performed at the fourth time T4. Similarly, the storing of a voltage corresponding to the maximum or high current flowing in the second inductor $L_2$ may be performed at the second time T2, and the storing of a voltage corresponding to the minimum or low current flowing in the first inductor $L_1$ may be performed at the third time T3.

FIGS. 2 through 10 illustrate only two inductors, i.e., the first and second inductors $L_1$ and $L_2$, and illustrate that currents have a phase difference of 180° therebetween, but the present disclosure is not limited thereto. Alternatively, six inductors may be provided, and currents may have a phase difference of 60° therebetween.

Figure 11:
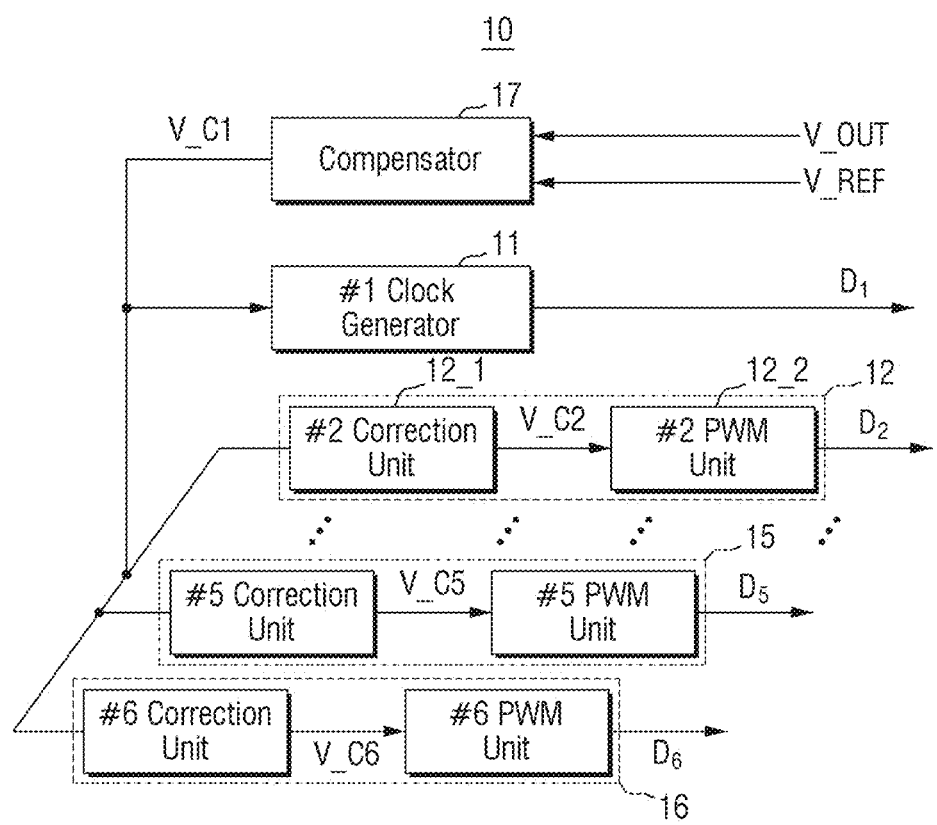
FIG. 11 is a detailed block diagram of the switching regulator according to some example embodiments of the present disclosure.

FIG. 11 is a detailed block diagram of the switching regulator according to some example embodiments of the present disclosure.

Referring to FIG. 11, the switching regulator 10 may further include a compensator 17 and first through sixth clock generators 11 through 16.

The compensator 17 may be connected to the output terminal ON of FIGS. 2 through 10 to receive an output voltage V_OUT, and may receive a reference voltage V_REF from the outside. The compensator 17 may generate a first voltage V_C1 based on the output voltage V_OUT and the reference voltage V_REF.

The first clock generator 11 may receive the first voltage V_C1 and may generate a first clock $D_1$ based on the first voltage V_C1. Second through sixth clocks $D_2$ through $D_6$ generated by the second through sixth clock generators 12 through 16, respectively, may correspond to slave clocks, and the first clock $D_1$ generated by the first clock generator 11 may correspond to a master clock.

The second through sixth clock generators 12 through 16 may have the same configuration. The second through sixth clock generators 12 through 16 may receive the first voltage V_C1 and may generate the second through sixth clocks $D_2$ through $D_6$, respectively, based on the voltage V_CF stored in the flying capacitor CF of FIGS. 2 through 10.

For example, the second clock generator 12 may include a second correction unit 12_1 and a second pulse width modulation (PWM) unit 12_2. The correction unit 12_1 may receive the first voltage V_C1 and may generate a second voltage V_C2 based on the first voltage V_C1 and the voltage stored in the flying capacitor CF.

The second PWM unit 12_2 may receive the second voltage V_C2 and may generate the second clock $D_2$ based on the second voltage V_C2.

Figure 12:
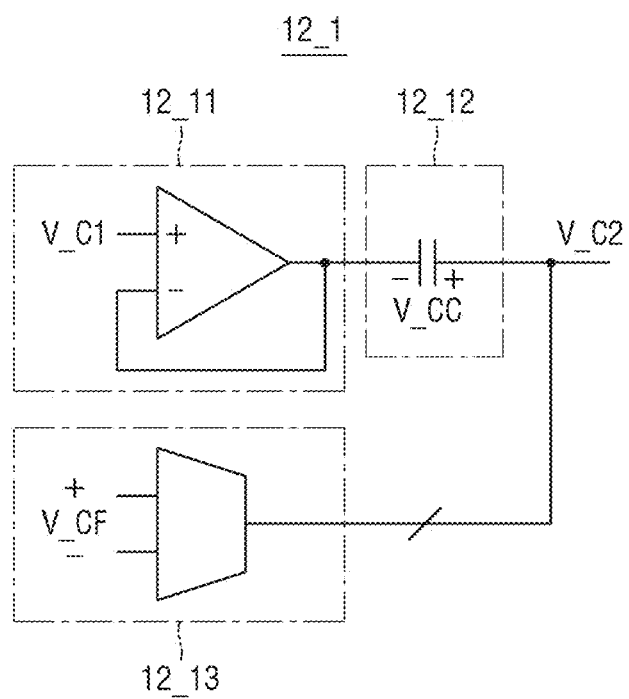
FIG. 12 is a circuit diagram of a correction unit of a second clock generator of FIG. 11.

FIG. 12 is a circuit diagram of the correction unit of the second clock generator of FIG. 11.

Referring to FIG. 12, the second correction unit 12_1 may include a buffer 12_11, a correction capacitor 12_12, and a voltage-controlled current source 12_13.

The buffer 12_11 may receive the first voltage V_C1. The output terminal of the buffer 12_11 may be connected to a first end of the correction capacitor 12_12.

The correction capacitor 12_12 may store a predetermined or desired voltage V_CC. Specifically, the correction capacitor 12_12 may store the voltage stored in the flying capacitor CF, to control the magnitude of the current flowing in the second inductor $L_2$ of FIGS. 2 through 10. The second voltage V_C2 output from a second end of the correction capacitor 12_12 may have the same magnitude as the sum of the first voltage V_C1 and the voltage V_CC stored in the correction capacitor 12_12.

The output terminal of the voltage-controlled current source 12_13 may be connected to the second end of the correction capacitor 12_12. The voltage V_CF of the flying capacitor CF of FIGS. 2 through 10 may be applied to the voltage-controlled current source 12_13. A current flowing in the voltage-controlled current source 12_13 may vary depending on the magnitude of the voltage V_CF of the flying capacitor CF. For example, as the magnitude of the voltage V_CF of the flying capacitor CF, corresponding to the polarity illustrated in FIG. 12, increases, the magnitude of a current from the correction capacitor 12_12 to the voltage-controlled current source 12_13 may increase.

For example, as described above with reference to FIGS. 2 through 10, the magnitude of the current flowing in the first inductor $L_1$ is less than the magnitude of the current flowing in the second inductor $L_2$, the voltage V_CF of the flying capacitor CF may have a positive value. To address a current imbalance, the second correction unit 12_1 may correct the second voltage V_C2 such that the magnitude of the current flowing in the second inductor $L_2$ may correspond to the magnitude of the current flowing in the first inductor $L_1$.

Specifically, a positive voltage V_CF from the flying capacitor CF is applied to the voltage-controlled current source 12_13, a current may flow from the second end of the correction capacitor 12_12 to the voltage-controlled current source 12_13. As a result, the voltage V_CC of the correction capacitor 12_12 may be reduced and may be output as the second voltage V_C2.

Figure 13:
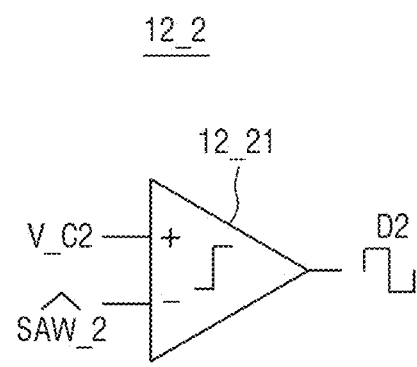
FIG. 13 is a circuit diagram of a pulse width modulation (PWM) unit of the second clock generator of FIG. 11.

FIG. 13 is a circuit diagram of the PWM unit of the second clock generator of FIG. 11.

Referring to FIG. 13, the second PWM unit 12_2 may include a comparator 12_21. The comparator 12_21 may generate the second clock $D_2$ based on the second voltage V_C2 from the second corrector 12_1 and a second saw signal SAW_2 from the outside.

Specifically, the second saw signal SAW_2 may be a sawtooth-shaped signal having a uniform period, and a second clock $D_2$ having a uniform duty ratio may be generated by comparing the second saw signal SAW_2 with the second voltage V_C2. However, the present disclosure is not limited to this. A method to generate the second clock $D_2$ may be implemented in various manners.

The control circuitry 17 may be hardware including logic circuits; a hardware/software combination such as a processor executing software; or a combination thereof. For example, the control circuitry 17 specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. The control circuitry 17 may include electrical components such as at least one of transistors, resistors, capacitors, etc. The processing circuitry may include electrical components such as logic gates including at least one of AND gates, OR gates, NAND gates, NOT gates, etc.

Processor(s), controller(s), and/or control circuitry may be configured to perform actions or steps by being specifically programmed to perform those action or steps (such as with an FPGA or ASIC) or may be configured to perform actions or steps by executing instructions received from a memory, or a combination thereof.

Example embodiments of the present disclosure have been described above with reference to the accompanying drawings, but the present disclosure is not limited thereto and may be implemented in various different forms. It will be understood that the present disclosure can be implemented in other specific forms without changing the technical spirit or gist of the present disclosure. Therefore, it should be understood that the example embodiments set forth herein are illustrative in all respects and not limiting.

What is claimed is:

1. A switching regulator comprising:
   a first inductor having a first end connected to a first node and a second end connected to an output terminal;
   a second inductor having a first end connected to a second node and a second end connected to the output terminal;
   a flying capacitor having a first end connected to the first node and a second end connected to the second node;
   a first switch connected to the first node to provide an input voltage to the first node;
   a second switch connected to the first node to provide a ground voltage to the first node;
   a third switch connected between the first node and the first end of the flying capacitor;
   a fourth switch connected between the first end of the flying capacitor and a ground terminal;
   a fifth switch connected to the second node to provide the input voltage to the second node;
   a sixth switch connected to the second node to provide the ground voltage to the second node;
   a seventh switch connected between the second end of the flying capacitor and the ground terminal;
   an eighth switch connected between the second node and the second end of the flying capacitor; and
   control circuitry configured to at each of first through fourth times control the first switch, the second switch, the third switch, the fourth switch, the fifth switch, the sixth switch, the seventh switch, and the eighth switch to cause the flying capacitor to store a voltage corresponding to a difference between a current flowing in the first inductor and a current flowing in the second inductor.

2. The switching regulator of claim 1, wherein the control circuitry is configured to cause,
   before the first time, the first switch to be closed to provide the input voltage to the first node and the sixth switch to be closed to provide the ground voltage to the second node,
   at the first time, the third switch to be closed to connect the first node and the first end of the flying capacitor and the seventh switch to be closed to connect the second end of the flying capacitor and the ground terminal, before the second time, the second switch to be closed to provide the ground voltage to the first node and the fifth switch to be closed to provide the input voltage to the second node, and at the second time, the fourth switch to be closed to connect the first end of the flying capacitor and the ground terminal and the eighth switch to be closed to connect the second node to the second end of the flying capacitor.

3. The switching regulator of claim 2, wherein the control circuitry is configured to cause, before the fourth point, the first switch to be closed to provide the input voltage to the first node and the sixth switch to be closed to provide the ground voltage to the second node, at the fourth point, the fourth switch to be closed to connect the first end of the flying capacitor to the ground terminal and the eighth switch to be closed to connect the second node to the second end of the flying capacitor, before the third point, the second switch to be closed to provide the ground voltage to the first node and the fifth switch to be closed to provide the input voltage to the second node, and at the third time, the third switch to be closed to connect the first node to the first end of the flying capacitor and the seventh switch to be closed to connect the second end of the flying capacitor to the ground terminal.

4. The switching regulator of claim 1, wherein the control circuitry is configured to cause, the third and seventh switches to be closed or opened at the same time, and the fourth and eighth switches to be closed or opened at the same time.

5. The switching regulator of claim 4, wherein the control circuitry is configured to cause, the first and sixth switches to be closed or opened at the same time, and the second and fifth switches to be closed or opened at the same time.

6. The switching regulator of claim 1, wherein the control circuitry is configured to cause, The first time to correspond to a time when the magnitude of the current flowing in the first inductor reaches a first upper threshold, and the second time to correspond to a time when the magnitude of the current flowing in the second inductor reaches a second upper threshold.

7. The switching regulator of claim 6, wherein the control circuitry is configured to cause, the third time to correspond to a time when the magnitude of the current flowing in the first inductor lowers to a first lower threshold, and the fourth time to correspond to a time when the magnitude of the current flowing in the second inductor lowers to a second lower threshold.

8. The switching regulator of claim 1, wherein the control circuitry is configured to cause the third, fourth, seventh, and eighth switches to be closed for the same period of time.

9. The switching regulator of claim 1, further comprising:
a compensator connected to the output terminal, the compensator configured to receive the output voltage, the compensator configured to receive a reference voltage and generate a first voltage based on the reference voltage;

a first clock generator configured to generate a first clock based on the first voltage; and a second clock generator configured to generate a second clock based on the first voltage and the voltage stored in the flying capacitor.

10. The switching regulator of claim 9, wherein the second clock generator includes a correction unit configured to receive the first voltage and generate a second voltage that is a corrected first voltage based on the voltage stored in the flying capacitor, and a pulse width modulation (PWM) unit configured to receive the second voltage from the correction unit, and to receive a saw signal from the outside, and to generate a second clock.

11. A system-on-chip (SoC) comprising:
a processor; and
a switching regulator supplying power to the processor, the switching regulator including, a first inductor having a first end connected to a first node and a second end connected to an output terminal, a second inductor having a first end connected to a second node and a second end connected to the output terminal, a flying capacitor having a first end connected to the first node or a ground terminal and a second end connected to the second node or the ground terminal, the first and second nodes receiving one of an input voltage and a ground voltage, and control circuitry configured to cause the flying capacitor to, sense a difference between a current flowing in the first inductor at a first time and a current flowing in the second inductor at a second time, the second time being different from the first time, and store the difference between the current flowing in the first inductor at the first time and the current flowing in the second inductor at the second time in a flying capacitor as a first voltage, and sense a difference between a current flowing in the first inductor at a third time and a current flowing in the second inductor at a fourth time, the fourth time being different from the third time, and store the difference between the current flowing in the first inductor at the third time and the current flowing in the second inductor at the fourth time in the flying capacitor as a second voltage, is the second voltage being different from the first voltage, wherein an output voltage is corrected based on the first and second voltages, and wherein a clock provided to a processor is generated based on the corrected output voltage.

12. The SoC of claim 11, wherein the control circuitry is configured to cause the first time to correspond to a time when the magnitude of the current flowing in the first inductor reaches a first upper threshold, and the second time to correspond to a time when the magnitude of the current flowing in the second inductor reaches a second upper threshold.

13. The SoC of claim 12, wherein the control circuitry is configured to cause
the third time to correspond to a time when the magnitude of the current flowing in the first inductor lowers to a first lower threshold, and
the fourth time to correspond to a time when the magnitude of the current flowing in the second inductor lowers to a second lower threshold.

14. The SoC of claim 11, wherein the control circuitry is configured to cause,
before the first time, the input voltage and the ground voltage to be provided to the first and second nodes, respectively,
at the first time, the first node to be connected to the first end of the flying capacitor and the second end of the flying capacitor to be connected to the ground terminal,
before the second time, the ground voltage and the input voltage to be provided to the first and second nodes, respectively,
at the second time, the first end of the flying capacitor to be connected to the ground terminal and the second node to be connected to the second end of the flying capacitor.

15. The SoC of claim 14, wherein the control circuitry is configured to cause,
before the fourth time, the input voltage and the ground voltage to be provided to the first and second nodes, respectively,
at the fourth time, the first end of the flying capacitor to be connected to the ground terminal and the second node to be connected to the second end of the flying capacitor,
before the third time, the ground voltage and the input voltage to be provided to the first and second nodes, respectively, and
at the third time, the first end of the flying capacitor to be connected to the first node and the second end of the flying capacitor to be connected to the ground terminal.

16. The SoC of claim 11, wherein the control circuitry is configured to cause
the first and fourth times to be the same, and
the second and third times to be the same.

17. An operating method of a switching regulator, comprising:
sensing a difference between a current flowing in a first inductor at a first time and a current flowing in a second inductor at a second time, the second inductor being different from the first inductor, the second time being different from the first time, and storing the difference between the current flowing in the first inductor at the first time and the current flowing in the second inductor at the second time in a flying capacitor as a first voltage;
sensing a difference between a current flowing in the first inductor at a third time and a current flowing in the second inductor at a fourth time, the fourth time being different from the third time, and storing the difference between the current flowing in the first inductor at the third time and the current flowing in the second inductor at the fourth time in the flying capacitor as a second voltage, is the second voltage being different from the first voltage;
correcting an output voltage based on the first and second voltages;
generating a clock based on the corrected output voltage; and
providing the clock to a processor.

18. The operating method of claim 17, wherein
the first time corresponds to a time when the magnitude of the current flowing in the first inductor reaches a first upper threshold, and
the second time corresponds to a time when the magnitude of the current flowing in the second inductor reaches a second upper threshold.

19. The operating method of claim 18, wherein
the third time corresponds to a time when the magnitude of the current flowing in the first inductor lowers to a first lower threshold, and
the fourth time corresponds to a time when the magnitude of the current flowing in the second inductor lowers to a second lower threshold.

20. The operating method of claim 17, wherein
control signals for the first and fourth times are the same, and
control signals for the second and third times are the same.

* * * * *